US 012410685B2

(12) United States Patent
Reding et al.

(10) Patent No.: US 12,410,685 B2
(45) Date of Patent: Sep. 9, 2025

(54) USING FLUID PILL FOR HEAT TRANSFER DOWNHOLE (71) Applicant: Halliburton Energy Services, Inc., Houston, TX (US)

(72) Inventors: Christian Reding, Houston, TX (US); David Earl Ball, Stafford, TX (US); Marcus Ray Hudson, Pearland, TX (US); James Cernosek, Richmond, TX (US); Jay Deville, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/403,437

(22) Filed: Jan. 3, 2024

(65) Prior Publication Data
US 2025/0215768 A1 Jul. 3, 2025

(51) Int. Cl.
*E21B 36/00* (2006.01)
*C09K 5/16* (2006.01)
*E21B 21/00* (2006.01)

(52) U.S. Cl.
CPC .............. *E21B 36/001* (2013.01); *C09K 5/16* (2013.01)

(58) Field of Classification Search
CPC ..... C09K 8/516; E21B 21/003; E21B 21/062; E21B 37/06; E21B 36/008; E21B 7/14; E21B 2200/08; E21B 7/18; E21B 29/02
See application file for complete search history.

(56) References Cited

U.S. PATENT DOCUMENTS

| 6,341,498 | B1 | 1/2002 | Difoggio |
| 7,669,661 | B2 | 3/2010 | Johnson |
| 8,631,867 | B2 | 1/2014 | Gordy et al. |
| 8,826,984 | B2 | 9/2014 | Sanderlin et al. |
| 8,840,803 | B2 | 9/2014 | Mazyar et al. |
| 11,624,279 | B2 | 4/2023 | Hudson et al. |
| 2013/0037270 | A1 | 2/2013 | Difoggio |
| 2013/0043028 | A1 | 2/2013 | Chakraborty et al. |
| 2013/0092379 | A1 | 4/2013 | Singh |
| 2016/0160609 | A1 | 6/2016 | Bondarenko |
| 2020/0199972 | A1 | 6/2020 | Zhan |

FOREIGN PATENT DOCUMENTS

WO    WO-2010042725 A2 *  4/2010  ............. E21B 10/00

OTHER PUBLICATIONS

PCT/US2024/010189, "International Search Report and Written Opinion", Sep. 24, 2024, 12 pages.

* cited by examiner

*Primary Examiner* — Zakiya W Bates
(74) *Attorney, Agent, or Firm* — Kilpatrick Townsend & Stockton LLP (57) ABSTRACT

A method of cooling at least a portion of a downhole tool located within a drilled wellbore using a fluid pill configured to transfer heat away from a heat-generating segment of the downhole tool. The downhole tool may be a wireline logging tool. The fluid pill can comprise at least one fluid coolant and may include other additives that enable the fluid pill to transfer heat away from a heat-generating segment of the downhole tool even in the presence of one or more fluids present in the drilled wellbore. The fluid pill can be introduced into residual drilling mud in the wellbore, and the downhole tool may thereafter be operated with the heat-generating segment thereof in fluid contact with the fluid pill, whereby heat generated by the heat-generating segment is transferred away from the downhole tool and toward a wall of the wellbore by the fluid pill.

20 Claims, 5 Drawing Sheets

USING FLUID PILL FOR HEAT TRANSFER DOWNHOLE

TECHNICAL FIELD

The present disclosure relates generally to hydrocarbon well operations, and more particularly although not necessarily exclusively, to cooling a downhole tool using a fluid pill.

BACKGROUND

In a hydrocarbon well operation, various post-drilling operations such as wireline logging operations, can be performed. Wireline logging operations, including open hole wireline logging operations, can allow a well operator to obtain information about formation characteristics, hydrocarbon characteristics, and other characteristics about a drilled well.

Wireline logging tools can employ various technologies to obtain particular well information. For example, wireline logging tools may employ different types of sensors, such as sensors for performing imaging operations, resistivity testing operations, etc. Wireline logging tools may employ spectroscopic, ultrasonic, magnetic resonance, and other technologies to obtain desired well information. A wireline logging tool can also be utilized to obtain hydrocarbon material samples or to perform sidewall coring or other formation material sample gathering operations.

The intended functions of some wireline logging tools can involve using high-powered components. These components generate heat during operation. The amount of heat generated can be significant. Additionally, wireline logging tools often operate at well depths where the natural temperature of the formation is already substantial, which contributes to the overall temperatures to which wireline logging tools may be subjected. It can be difficult for wireline logging tools to dissipate heat given the nature of the environment in which the tools operate. For example, in addition to confined spaces, open hole wireline logging tools typically operate in residual drilling mud that is present in the wellbore as a result of the well drilling operation. This can exacerbate tool heating, as the primary mechanism for transferring heat away from downhole wireline logging tools is natural or free convection, which relies upon low sheer stresses and flow-rates created through density gradients resulting from temperature gradients, and the high viscosity of typical drilling mud greatly diminishes heat dissipation. The specific heat and thermal conductivity properties of drilling mud may also be not conducive to the transfer of heat away from wireline logging tools. This can be problematic, as exposure to excessive heat can damage wireline logging tools.

DETAILED DESCRIPTION

Certain aspects and examples of the present disclosure relate to using a fluid pill to cool a downhole tool while the downhole tool operates within a wellbore of a hydrocarbon well. The downhole tool may be a wireline logging tool used to evaluate a formation or fluid deposits within a formation surrounding a drilled wellbore of a hydrocarbon well, or another tool used in a different post-drilling wellbore operation. A fluid pill according to some examples generally includes a predetermined volume of an oil-based fluid coolant or a water-based fluid coolant. The coolant can be introduced into the wellbore to transfer heat from the downhole tool while the downhole tool operates in the post-drilling downhole environment. According to one example, an oil-based fluid pill can be an inert emulsion having a range of oil-to-water ratios. According to another example, a water-based fluid pill may include one or more types of brine. A fluid pill may also include two or more types of fluids that may be maintained separately, but are allowed to mix subsequent to be positioned downhole to produce a localized heat transfer-improving reaction. A fluid pill can also include one or more additives that, once introduced into the drilling mud, can react with well fluid already present in the wellbore to alter the properties of the well fluid in a desired manner. Examples of fluid pills can include one or more convection-improving thinning agents, or one or more thermal conductivity-improving materials. In any case, the composition of the fluid pill can impart the fluid pill with heat transfer properties that can transfer more heat than the mud or other fluids already present in the wellbore.

In one example, a fluid pill including at least one fluid coolant can be used to cool a downhole tool, particularly in an area of a heat-generating segment of the downhole tool. A coolant can be one or more of various fluids that can naturally transfer heat more effectively than typical downhole fluids. For example, a fluid coolant can provide better heat transfer than the drilling mud.

A fluid pill can be introduced into drilling mud or other fluids already present in the wellbore from a prior drilling operation, such that the fluid pill is positioned at a target location within the wellbore substantially simultaneously with an intended time of operation of the heat-generating segment of the downhole tool at the target location. For example, the fluid pill may be introduced into the drilling mud by inserting tubing into the wellbore to or near a target location and injecting the fluid pill into the drilling mud via the tubing. In another example, the fluid pill may be introduced into the drilling mud using a specially designed downhole tool that includes a chamber for carrying the fluid pill and a pump or a similar mechanism for ejecting the fluid pill from the downhole tool at a target location within the wellbore.

In some examples, a fluid pill can be positioned at a target location within a wellbore prior to introduction of the downhole tool into the wellbore or prior to positioning of a heat-generating segment of the downhole tool at the target location. In either case, the downhole tool can subsequently be located in the wellbore such that the heat-generating segment of the downhole tool is in fluid contact with the fluid pill. Heat generated by the heat-generating segment of the downhole tool during operation can thereafter be transferred away from the downhole tool by the fluid pill, such as toward a wall of the wellbore. This transfer of heat by the fluid pill can cool the downhole tool. In another example, a fluid pill can be introduced into the drilling mud in a wellbore after the downhole toll has been operated for some pre-selected amount of time to displace hot drilling mud surrounding a heat-generating segment of the downhole tool.

A downhole tool according to an example of the present disclosure may include a tool body that is carried on a tool string to be positioned within a well bore of a hydrocarbon well. The downhole tool may also include at least one heat-generating segment, such as a high-powered sensor or another heat-generating device. A refillable chamber, such as a tank, can be located within the tool body of the downhole tool to releasably contain a fluid pill and to transport the fluid pill into the wellbore with the downhole tool. A pump can also be located within the tool body of the downhole tool. The pump can be in fluid communication with the refillable chamber in the tool body, as well as with an exit port in the tool body.

In operation, the downhole tool can be deployed within the wellbore until the area of the tool body having the refillable chamber and pump is at or near a location where it is desired to introduce the fluid pill into drilling mud present in the wellbore. For example, when the density of the fluid pill relative to the drilling mud is such that the fluid pill sinks by some amount within the drilling fluid, it may be desirable to introduce the fluid pill into the drilling mud at a location uphole of the location of intended operation of the heat-generating segment of the downhole tool. When the downhole tool is properly located for fluid pill introduction, the pump can be controlled, such as by a controller that is communicatively coupled thereto, to expel the fluid pill through the exit port of the tool body and into the surrounding drilling mud. The downhole tool can thereafter be operated, or moved and then operated, so that operation of the downhole tool occurs with the heat-generating segment thereof in fluid contact with the fluid pill. Heat generated by the heat-generating segment of the downhole tool will then be transferred by the fluid pill away from the downhole tool, such as toward a wall of the wellbore. This transfer of heat can cool the downhole tool.

A fluid pill may have various compositions according to examples of the present disclosure. For example, a fluid pill according to the present disclosure may include an oil-based fluid or a water-based fluid. According to one example, when the fluid pill includes an oil-based fluid, the oil-based fluid may be an invert emulsion with a range of oil-to-water ratios. For example, the oil-to-water ratio may be in the range of about 20:80 to about 100:0. The water phase of the emulsion can be a brine containing various salts, such as but not limited to, chloride, bromide, or formate salts. According to another example, when the fluid pill is a water-based fluid, the fluid pill may include a brine, such as a chloride brine, a bromide brine, or a formate brine.

A fluid pill according to an example of the present disclosure may also include one or more convection-improving thinning agents, such as but not limited to, polyacrylates, lignosulfonates, phosphates, surfactants, and polyimides. A fluid pill may also include one or more thermal conductivity-improving materials, such as but not limited to, carbon black, metals, ceramics, nanomaterials, and nanoparticles. Other common mud additives may be present including emulsifiers, shale stabilizers, rheology modifiers, corrosion inhibitors, lubricants, bridging agents, and weighting agents.

A fluid pill may include two or more types of fluids that may be maintained separately, but are allowed to mix subsequent to being positioned downhole. When the two or more types of fluids mix downhole, a desired reaction can occur to improve heat transfer performance. For example, allowing the two or more types of fluids to mix or otherwise contact each other may result in an endothermic chemical reaction within the wellbore that produces a transient temperature reduction in the drilling mud. In another example, a fluid pill may include a single fluid containing one or more reactants that are maintained separately via a coating on/encapsulation of at least one of the reactants. The reactants may be allowed to mix subsequent to be positioned downhole through degradation of the reactant coating(s) and release of the reactant(s). Coating degradation may occur over time in the presence of one or more well fluids, may be caused by a temperature change, or both. When the two or more reactants mix downhole, a desired reaction can occur to improve heat transfer performance. For example, an endothermic chemical reaction may again occur within the wellbore to produce a transient temperature reduction in the drilling mud. In another example, a desired downhole reaction can also be accomplished by placing one or more phase change materials in a fluid pill. In this example, the fluid pill containing the phase change material(s) can be released at a desired downhole location, or an encapsulated phase change material(s) can be released from the fluid pill at a desired downhole location. In either case, the phase change material(s) can absorb heat from the formation or heat generated by a downhole tool, and can use the absorbed heat to change phase (e.g., solid-to-liquid, liquid-to-gas). The heat absorbed by the phase change material(s) is thus prevented from entering and heating the drilling mud or other fluid present in the wellbore. When a fluid pill containing a phase change material(s) is returned to the surface, the phase change material(s) can revert back to its previous phase, which emits heat and also renders the phase change material(s) ready for reuse. In yet another example, a fluid pill can include one or more additives that, once introduced into the drilling mud, can react with well fluid already present in the wellbore to alter the properties of the well fluid in a desired manner.

Illustrative examples follow and are given to introduce the reader to the general subject matter discussed herein rather than to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
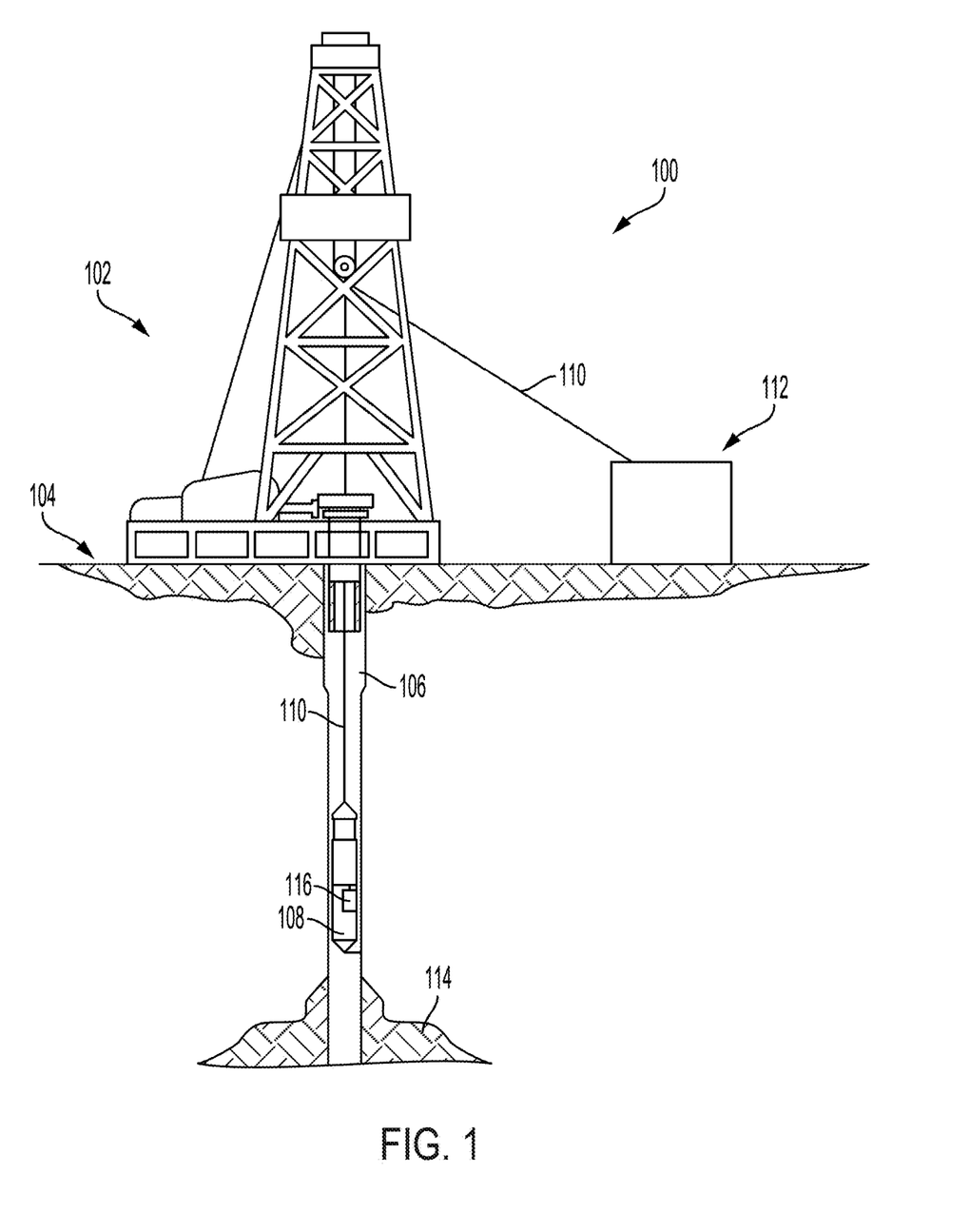
FIG. 1 is a schematic diagram of a hydrocarbon well having a downhole tool deployed therein according to one example of the present disclosure.

One example of a hydrocarbon well 100 is represented in the diagram of FIG. 1. As shown, the hydrocarbon well 100 can include a rig 102 located at a well (earth) surface 104 above a wellbore 106. The rig 102 is used, in this example, in conjunction with a mechanism for conveying a downhole tool 108 relative to the wellbore 106. More specifically, the rig 102 is used to assist with conveying the downhole tool 108 relative to the wellbore 106 using a wireline rigup including a wireline 110 and an associated wireline conveyance mechanism 112. The wireline conveyance mechanism 112 may be a powered reel, a wireline logging truck, etc. The downhole tool 108 may have at least one heat-generating segment 116, such as but not limited to a segment in which high-powered electronic components are located. The downhole tool 108 in this example is a wireline logging tool, but the downhole tool 108 may be a different type of tool in other examples.

The wellbore 106 in FIG. 1 is drilled into a subterranean formation 114. In other examples, a wellbore can be drilled through a sub-sea formation. The wellbore 106 is shown to include a vertical portion in this example. In other examples, a wellbore can alternatively or also include a horizontal portion or a deviated portion. The well may be a hydraulic fracturing well. While the entirety of the wellbore 106 is depicted in FIG. 1 as an open-hole wellbore for purposes of illustration, it should be understood that in other examples, at least a portion of the wellbore 106 may have a casing installed therein.

While the rig 102 of the hydrocarbon well 100 is used to convey the downhole tool 108 via a wireline 110 according to the example of FIG. 1, the downhole tool 108 may instead be conveyed by tubing, which may be coiled tubing, drill pipe, etc. In still other examples, the rig 102 may be replaced with a wellhead (e.g., Christmas tree) or another well completion apparatus, and a different wireline rigup may be present to convey the downhole tool 108 relative to the wellbore 106.

Upon completion of the drilling operation, or at least a given stage of a drilling operation, it may be desirable to evaluate the nature of the formation into which the wellbore 106 was drilled, or the nature of the fluids that are accessible from the wellbore 106. Such operations may be conducted using a wireline logging tool, such as but not limited to, the wireline logging tool 108 example shown in FIG. 1.

Figure 2:
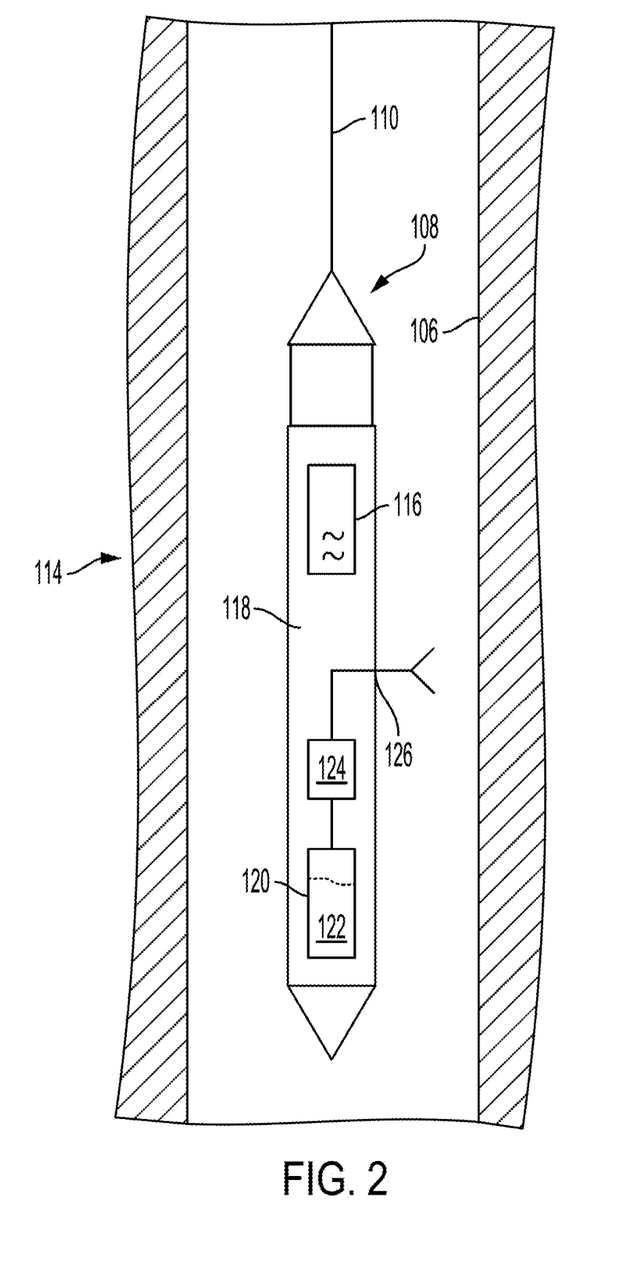
FIG. 2 is schematic diagram of a downhole tool according to one example of the present disclosure deployed in a wellbore.

An enlarged schematic representation of the downhole tool 108 of FIG. 1 is presented in FIG. 2. As shown, the downhole tool 108 is suspended within the wellbore 106 from the wireline 110 and can include a tool body 118. The downhole tool 108 may be a part of a larger overall tool string, but is in any case positioned within the wellbore 106 at different target locations (e.g., fluid pill introduction locations or intended locations of tool operation) using the rig 102 and the wireline conveyance mechanism 112. The downhole tool 108 may also include at least one heat-generating segment 116, such as without limitation, one or more high-powered sensors used to evaluate the formation 114 or fluids within the formation 114 or the wellbore 106.

As shown in FIG. 2, a chamber 120 may reside within the tool body 118 of the downhole tool 108. The chamber 120 itself may form a liquid-tight vessel for holding a fluid pill. Alternatively, a separate tank for holding a fluid pill may be located in the chamber 120. The chamber 120 may be refilled in some examples. For example, after a first fluid pill is expelled from the chamber 120 during operation of the downhole tool 108, the downhole tool 108 may be withdrawn from the wellbore and the chamber 120 may be refilled with another fluid pill. A port or another sealable opening may pass through the tool body 118 for refilling of the chamber 120. In any case, the chamber 120 is configured to releasably contain a fluid pill 122, such that the fluid pill 122 can be transported into the wellbore 106 with the downhole tool 108.

A pump 124 can also be located within the tool body 118 of the downhole tool 108. The pump 124 may be in fluid communication with the chamber 120 in the tool body 118. In one example of the downhole tool 108, the pump 124 can be a powered pump, such as an electric pump that receives electric energy through the wireline 110. In another example of the downhole tool 108, the pump 124 may be a spring-powered pump. The pump 124 may also be a reversible pump according to an example of the present disclosure.

The pump 124 may also be in fluid communication with a port 126 in the tool body 118. When instructed to do so, the pump 124 can expel the fluid pill 122 or a portion of the fluid pill 122 from the chamber 120 via the port 126. In one example of the downhole tool 108, the port 126 may be exclusively an exit port. In another example of the downhole tool 108, the port 126 may function as an exit port through which a fluid pill 122 in the chamber 120 can be expelled, as well as an extraction port through which a previously expelled fluid pill (or another fluid in the wellbore 106) can be extracted from the drilling mud and returned to the chamber 120 using the pump 124.

In some examples, more than one fluid chamber 120 may reside within the tool body 118 of the downhole tool 108. Each chamber 120 may form a liquid-tight vessel for holding a fluid pill or may retain a separate tank for holding a fluid pill, as described above. Each chamber 120 of a multi-chamber downhole tool example may likewise include any of the other features and functionality of the chamber 120 described above relative to the downhole tool 108 of FIG. 2. Still further, a given tool string may include multiple tool bodies 118, each of which can have one or more chambers 120 for holding a fluid pill. When multiple chambers 120 are present within a tool body 118 or within several tool bodies 118 of a tool string, the chambers 120 may all contain fluid pills of like composition, or fluid pills of different compositions may be contained in different ones of the chambers 120 for accomplishing different heat management objectives at one or more downhole locations within a wellbore. When multiple chambers 120 are present within a given tool body 118, a separate pump 124 may be in fluid communication with each chamber 120, or a single pump 124 may be in temporary fluid communication with some of the chambers 120 or all of the chambers 120. In the latter case, a single pump 124 can be selectively hydraulically coupled to a given chamber 120 by way of a controllable valve or another controllable hydraulic coupling mechanism. In a multi-chamber example, the pump(s) 124 can be used to expel a fluid pill from a given chamber 120 or to extract a fluid pill to a given chamber 120 of the multiple chambers 120 using one or more ports 126 in the tool body 118, as described above relative to the downhole tool 108 of FIG. 2.

Figure 3:
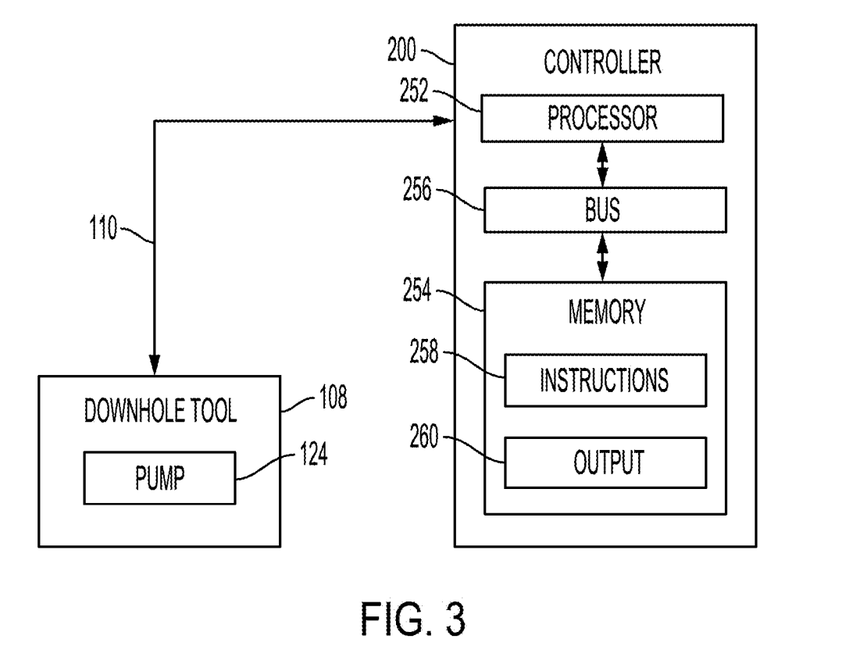
FIG. 3 is a schematic diagram of a control system for use with a downhole tool according to one example of the present disclosure.

A controller or a similar device may be provided to control at least the pump 124 of the downhole tool 108. One example of such a controller 200 is schematically represented in FIG. 3. As indicated, the controller 200 may be communicatively coupled to at least the pump 124 of the downhole tool 108. It is also possible in some examples for the controller 200 to be communicatively coupled to other components of the downhole tool 108, such as sensors, other controllers, etc. In any case, the controller 200 may provide output 260. For example, the controller 200 can output commands that may be used to control the pump 124 of the downhole tool 108, such as by instructing the pump 124 to expel the fluid pill through the port in the tool body. One or more controllers 200 may similarly be used to control one or more pumps 124 of a downhole tool 108 having multiple chambers.

The controller 200 can include a processor 252 that may be communicatively coupled to a memory 254, such as by a bus 256. The processor 252 can include one processor or multiple processors. Non-limiting examples of the processor 252 include a Field-Programmable Gate Array (FPGA), an application specific integrated circuit (ASIC), a microprocessor, or any combination of these.

Instructions 258 may be stored in the memory 254. The instructions 258 are executable by the processor 252 for causing the processor 252 to perform various operations. In some examples, the instructions 258 can include processor specific instructions generated by a compiler or an interpreter from code written in any suitable computer-programming language, such as C, C++, C#, Java, or Python. Through the instructions 258, the processor 252 may operate as described above to perform the various operations of the controller 200 related to operating the pump 124 of the downhole tool 108 to timely expel the fluid pill 122 from the chamber 120 of the downhole tool 108 into the wellbore 106.

The memory 254 can include one memory device or multiple memory devices. The memory 254 can be non-volatile and may include any type of memory device that retains stored information when powered off. Non-limiting examples of the memory 254 include electrically erasable and programmable read-only memory (EEPROM), flash memory, or any other type of non-volatile memory. At least some of the memory device includes a non-transitory computer-readable medium from which the processor 252 can read the instructions 258. A non-transitory computer-readable medium can include electronic, optical, magnetic, or other storage devices capable of providing the processor 252 with the instructions 258 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 258.

Figure 4:
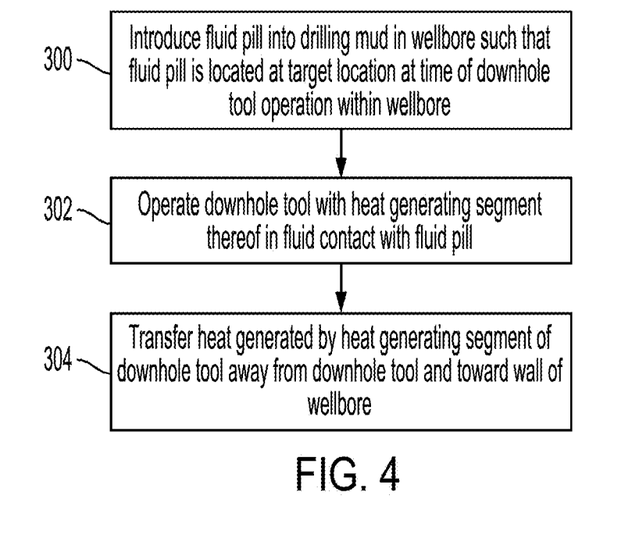
FIG. 4 is a flow chart of a method for cooling a downhole tool operating in a wellbore of a hydrocarbon well according to one example of the present disclosure.

FIG. 4 is a flowchart representing a process for cooling a downhole tool located within a wellbore using a fluid pill. In block 300, a fluid pill is introduced into drilling mud located within a wellbore of interest. The fluid pill can include at least one oil-based or water-based fluid coolant. The fluid pill may include one or more convection-improving thinning agents, or one or more thermal conductivity-improving materials. The fluid pill may include two or more separate fluids that are mixable subsequent to being positioned downhole at a target location to produce, via an endothermic chemical reaction, a transient temperature reduction in residual drilling mud present in the wellbore. The fluid pill can also include one or more additives that are reactive with well fluid already present in the wellbore to alter the properties of the well fluid in a desired manner. The heat transfer properties of the fluid pill are superior to the heat transfer properties of the mud or other fluids already present in the drilled wellbore.

The fluid pill is positioned at a target location within the wellbore, where the target location is an intended location of operation of a heat-generating segment of the downhole tool. Positioning the fluid pill at the target location can entail depositing the fluid pill exactly at the target location, or initially depositing the fluid pill above the target location, or below the target location, based on any anticipated sinking or rising of the fluid pill within the drilling mud and any planned movement of the downhole tool relative to the wellbore after introduction of the fluid pill. For example, if the downhole tool is currently at a given location in the wellbore but will be moved to a next target location, the fluid pill may be introduced into the drilling mud so that the fluid pill is located at the target location at an intended time of operation of the heat-generating segment of the downhole tool at the target location. The fluid pill may be introduced into the drilling mud in various ways, such as via tubing inserted into the wellbore, by transport within the downhole tool and subsequent expulsion therefrom, or by other pill spotting mechanisms.

At block 302, the downhole tool can then be operated within the wellbore with the heat-generating segment thereof in fluid contact with the fluid pill. The downhole tool may be a wireline logging tool. In some examples, the wireline logging tool may employ different types of sensors to obtain desired well information. The sensors may be high-powered sensors that generate significant heat while operating. The heat generated by the sensors can combine with an already elevated natural temperature of the formation to subject the wireline logging tool to an even greater amount of overall heat. Downhole tool heating can be further exacerbated by the confined nature of the wellbore space, and diminished heat dissipation resulting from the high viscosity of typical drilling mud. Exposure to excessive heat can damage wireline logging tools.

In block 304, the fluid pill can transfer the heat generated by the heat-generating segment of the downhole tool away from the downhole tool and toward a heat sink, such as a wall of the wellbore. In response to transferring the heat from the downhole tool, the temperature of at least the sensors or other heat-generating elements of the downhole tool can be reduced. This can allow the sensors or other heat-generating elements of the downhole tool to operate without being exposed to excess heat, and may extend the length of time that the sensors or other heat-generating elements can be operated without overheating.

After the fluid pill has transferred heat away from the downhole tool, the fluid pill may be eventually absorbed into and dissipated by the drilling mud or other fluids present in the wellbore. When the fluids within the wellbore are flowing, the used fluid pill may flow away from the target location and through the wellbore with the other fluids. In some examples, it may instead be possible to extract the used fluid pill from the drilling mud and return the fluid pill to the well surface.

Figure 5:
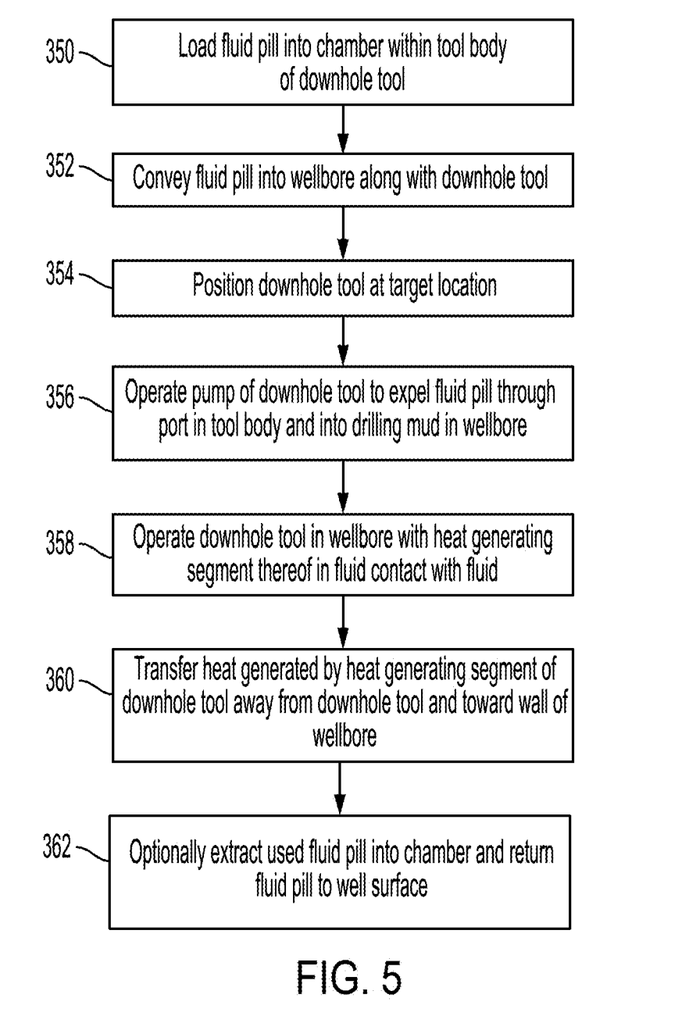
FIG. 5 is a flow chart of another method for cooling a downhole tool operating in a wellbore of a hydrocarbon well according to one example of the present disclosure.

FIG. 5 is a flowchart representing another process for cooling a downhole tool located within a wellbore using a fluid pill. The fluid pill may have any composition described above, including but not limited to the composition described relative to the process represented in FIG. 4.

As indicated at block 350 a fluid pill is loaded into a chamber located within a tool body of a downhole tool. The downhole tool may again be a wireline logging tool such as is described above, including but not limited to the wireline logging tool described relative to the process represented in FIG. 4. The chamber may be configured to releasably contain the fluid pill. In some examples, the chamber may form a liquid-tight vessel within the tool body for holding a fluid pill. In other examples, a separate tank for holding a fluid pill may be located in the chamber. In some The chamber may be refilled after a fluid pill is expelled from therefrom, such as by withdrawing the downhole tool from the wellbore and introducing another fluid pill into the chamber via a port or another opening through the tool body.

In block 352, the fluid pill is thereafter conveyed into the wellbore along with the downhole tool, such as using the wireline arrangement shown in FIG. 1. A downhole tool and a fluid pill residing therein may instead be conveyed into a wellbore using tubing or pipe in other examples. The fluid pill is releasably contained within the chamber in the tool body as the downhole tool travels within the wellbore.

As indicated in block 354, the downhole tool can be positioned at a target location, which is a location of intended operation of a heat-generating segment of the downhole tool within the wellbore. The heat-generating tool may again be a wireline logging tool and may again employ different types of sensors or other devices that generate unwanted heat. Once positioned at the target location, a pump located in the tool body of the downhole tool and in fluid communication with the chamber of downhole tool, can be operated to expel the fluid pill through a port in tool body and into the wellbore, as is represented in block 356. The pump can be operated in response to, for example, receipt of a command from a controller that is communicatively coupled to the pump. The fluid pill can thus be introduced into the drilling mud in the wellbore such that the fluid pill is positioned at the target location coincidentally with operation of the heat-generating segment of the downhole tool at the target location.

In block 358, the downhole tool can then be operated within the wellbore with the heat-generating segment thereof in fluid contact with the fluid pill. Operation of the sensors or other devices of the heat-generating segment of the downhole tool produces heat that can damage the sensors or other downhole tool components. Downhole tool heating can again be further exacerbated by the confined nature of the wellbore space, and diminished heat dissipation resulting from the high viscosity of typical drilling mud.

As indicated at block 360, the fluid pill can transfer the heat generated by the heat-generating segment of the downhole tool away from the downhole tool and toward a heat sink, such as a wall of the wellbore. In response to transferring the heat from the downhole tool, the temperature of at least the sensors or other heat-generating components of the downhole tool can be reduced. This can allow the sensors or other heat-generating components of the downhole tool to operate without being exposed to excess heat, and may extend the length of time that the sensors or other heat-generating components can be operated without overheating.

After the fluid pill has transferred heat away from the downhole tool, the fluid pill may be eventually absorbed into and dissipated by the drilling mud or other fluids present in the wellbore. When the fluids within the wellbore are flowing, the used fluid pill may flow away from the target location and through the wellbore with the other fluids. As represented in block 362, subsequent to expulsion from the tool body, the used fluid pill may optionally be extracted from the drilling mud in another example. The used fluid pill may be extracted by operating the pump in the tool body in a reverse (suction) mode to evacuate the fluid pill from the drilling mud and return the fluid pill to the chamber in the tool body. The fluid pill may be returned to the chamber in the tool body via the same port through which the fluid pill was previously expelled, which can be a two-way port in this example. The downhole tool may thereafter be relocated to another target location within the wellbore and the fluid pill can again be expelled into the drilling mud in the wellbore through the port in the tool body to cool the heat generating segment of the downhole tool at the new target location. Alternatively, the extracted fluid pill may be returned to the well surface upon withdrawal of the downhole tool from the wellbore.

According to aspects of the present disclosure, a method, a downhole tool, and a system, are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a method of cooling a downhole tool located within a drilled wellbore, the method comprising: providing a fluid pill comprising at least one fluid coolant; introducing the fluid pill into residual drilling mud present in the wellbore such that at least a portion of the fluid pill is positioned at a target location within the wellbore at an intended time of operation of a heat-generating segment of the downhole tool at the target location; operating the downhole tool to perform a post-drilling operation within the wellbore with the heat-generating segment fluidly contacting the fluid pill; and transferring, by the fluid pill, heat generated by the heat-generating segment of the downhole tool away from the downhole tool and toward a wall of the wellbore.

Example 2 is the method of example 1, wherein the fluid pill includes one or more convection-improving thinning agents selected from the group consisting of polyacrylates, lignosulfonates, phosphates, surfactants, and polyimides.

Example 3 is the method of example 1, wherein the fluid pill includes one or more thermal conductivity-improving materials selected from the group consisting of carbon black, metals, ceramics, nanomaterials, and nanoparticles.

Example 4 is the method of example 1, wherein the fluid pill comprises two or more types of fluids that are maintained separately but caused to mix once downhole at the target location to produce an endothermic chemical reaction within the wellbore that results in a transient temperature reduction in the residual drilling mud.

Example 5 is the method of example 1, wherein the fluid pill comprises one or more additives that react with well fluid already present in the wellbore to alter one or more properties of the well fluid.

Example 6 is the method of example 1, wherein the fluid pill is introduced into the residual drilling mud in the wellbore after the downhole tool is operated for a preselected amount of time, to displace residual drilling mud surrounding the heat-generating segment of the downhole tool.

Example 7 is the method of example 1, wherein: the fluid pill is releasably contained in a chamber of the downhole tool and is conveyed into the wellbore with the downhole tool; and a pump located within a tool body of the downhole tool and in fluid communication with the chamber, expels the fluid pill into the residual drilling mud in the wellbore through a port in the tool body.

Example 8 is the method of example 7, wherein: subsequent to expulsion of the fluid pill, the fluid pill is extracted from the residual drilling mud through the port in the tool body and returned to the chamber in the downhole tool; the downhole tool is relocated within the wellbore; and the fluid pill is again expelled into the residual drilling mud in the wellbore through the port in the tool body.

Example 9 is a downhole tool for use in a post-drilling operation, comprising: a heat-generating segment; and a tool body positionable on a tool string for running the downhole tool into a drilled wellbore, the tool body defining a chamber therein to include a fluid pill that is configured to transfer heat from the heat-generating segment to a wall of the wellbore.

Example 10 is the downhole tool of example 9, further comprising: a pump within the tool body and in fluid communication with the chamber; and a port in the tool body through which the fluid pill is expellable by the pump into the drilled wellbore.

Example 11 is the downhole tool of example 10, wherein: the port in the tool body is a two-way port; and the pump is usable to extract an expelled fluid pill from the drilled wellbore and to return the fluid pill to the chamber in the tool body through the port.

Example 12 is the downhole tool of example 9, wherein the downhole tool is a wireline logging tool and the heat generating segment includes at least one sensor for evaluating the drilled wellbore, a formation surrounding the drilled wellbore, or a fluid located within the drilled wellbore.

Example 13 is a system comprising: a downhole tool for use in a post-drilling operation, comprising: a heat-generating segment; a tool body positionable on a tool string for running the downhole tool into a drilled wellbore, the tool body defining a chamber therein; and a pump located within the tool body and in fluid communication with the chamber; a fluid pill residing in the chamber within the tool body, the fluid pill configured to transfer heat from the heat-generating segment to a wall of the drilled wellbore; and a controller communicatively coupled to the pump and configured to output commands to instruct the pump to expel the fluid pill from the tool body into the drilled wellbore.

Example 14 is the system of example 13, wherein the tool body includes a port in fluid communication with the pump, and the fluid pill is expellable by the pump into the drilled wellbore through the port.

Example 15 is the system of example 14, wherein: the port in the tool body is a two-way port; and the pump is usable to extract an expelled fluid pill from the drilled wellbore and to return the fluid pill to the chamber in the tool body through the port.

Example 16 is the system of example 13, wherein the controller is located outside of the drilled wellbore and is communicatively coupled to the pump by a wireline.

Example 17 is the system of example 13, wherein the fluid pill includes at least one fluid coolant and one or more convection-improving thinning agents selected from the group consisting of polyacrylates, lignosulfonates, phosphates, surfactants, and polyimides.

Example 18 is the system of example 13, wherein the fluid pill includes at least one fluid coolant and one or more thermal conductivity-improving materials selected from the group consisting of carbon black, metals, ceramics, nanomaterials, and nanoparticles.

Example 19 is the system of example 13, wherein the fluid pill comprises two or more types of separate fluids that are mixable once downhole at a target location to produce, via an endothermic chemical reaction, a transient temperature reduction in residual drilling mud present in the wellbore.

Example 20 is the system of example 13, wherein the fluid pill comprises one or more additives that are reactive with well fluid already present in the wellbore to alter one or more properties of the well fluid.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A downhole tool for use in a post-drilling operation, comprising:
    a heat-generating segment;
    a tool body positionable on a tool string for running the downhole tool into a drilled wellbore;
    a first chamber and a second chamber separately defined within the tool body, each of the first chamber and the second chamber configured to releasably hold a fluid pill comprising one or more materials that enable the fluid pill to transfer heat from the heat-generating segment of the downhole tool to a wall of the wellbore;
    at least one port in the tool body; and
    a pump within the tool body, the pump in fluid communication with the first chamber, the second chamber, and the at least one port, and operatable to selectively expel a fluid pill from one or both of the first chamber and the second chamber through the at least one port and into the drilled wellbore.

2. The downhole tool of claim 1, further comprising:
    a first controllable valve fluidly coupling the first chamber to the pump and a second controllable valve fluidly coupling the second chamber to the pump; and
    wherein the first controllable valve and the second controllable valve are operatable to place the pump in temporary fluid communication with one or both of the first chamber and the second chamber and to thereby cause an operation of the pump to selectively expel a fluid pill from one or both of the first chamber or the second chamber.

3. The downhole tool of claim 1, wherein:
    at least one of the ports in the first chamber and the second chamber is a two-way port; and
    the pump is a reversible pump and is further operatable to selectively extract a fluid pill from the drilled wellbore into the first chamber or the second chamber through the at least one two-way port.

4. The downhole tool of claim 1, wherein the downhole tool is a wireline logging tool and the heat generating segment includes at least one sensor for evaluating the drilled wellbore, a formation surrounding the drilled wellbore, or a fluid located within the drilled wellbore.

5. The downhole tool of claim 1, further comprising a refillable tank located in the each chamber and configured to contain the fluid pill.

6. The downhole tool of claim 1, wherein the pump is an electric pump or a spring-powered pump.

7. A system comprising:
    a downhole tool for use in a post-drilling operation, comprising:
        a heat-generating segment,
        a tool body positionable on a tool string for running the downhole tool into a drilled wellbore, the tool body defining-a at least one chamber therein,
        at least one port in the tool body, and
        a pump located within the tool body and in fluid communication with the at least one port and the at least one chamber;
    a fluid pill residing in the at least one chamber within the tool body, the fluid pill including one or more materials that enable the fluid pill to cool the downhole tool via a transfer of heat from the heat-generating segment of the downhole tool to a wall of the drilled wellbore; and
    a controller communicatively coupled to the pump and configured to output commands to instruct the pump to expel the fluid pill from the at least one chamber through the at least one port in the tool body and into the drilled wellbore.

8. The system of claim 7, wherein the fluid pill comprises one or more phase change materials.

9. The system of claim 8, wherein:
    the port in the tool body is a two-way port; and
    the pump is operatable to extract a fluid pill from the drilled wellbore into the at least one chamber in the tool body through the two-way port.

10. The system of claim 7, wherein the controller is located outside of the drilled wellbore and is communicatively coupled to the pump by a wireline.

11. The system of claim 7, wherein the fluid pill includes at least one fluid coolant.

12. The system of claim 11, wherein the fluid pill further includes one or more thermal conductivity-improving materials selected from the group consisting of carbon black, metals, ceramics, nanomaterials, and nanoparticles.

13. The system of claim 11, wherein the fluid pill further includes one or more convection-improving thinning agents selected from the group consisting of polyacrylates, lignosulfonates, phosphates, surfactants, and polyimides.

14. The system of claim 7, wherein the fluid pill has a composition selected from the group consisting of two or more types of separate fluids that are mixable once downhole at a target location to produce, via an endothermic chemical reaction, a transient temperature reduction in residual drilling mud present in the wellbore, and one or more additives that are reactive with well fluid already present in the wellbore to alter one or more properties of the well fluid.

15. The system of claim 7, wherein:
the at least one chamber is a plurality of chambers, each of which contains a fluid pill; and
at least two of the fluid pills in the plurality of chambers have dissimilar compositions that are combinable in the drilled wellbore to cause a transient temperature reduction in residual drilling mud present in the drilled wellbore via an endothermic chemical reaction.

16. The system of claim 7, wherein the downhole tool is a wireline logging tool and the heat generating segment includes at least one sensor for evaluating the drilled wellbore, a formation surrounding the drilled wellbore, or a fluid located within the drilled wellbore.

17. The system of claim 7, wherein the fluid pill is an oil-based inert emulsion having an oil-to-water ratio of between 20:80 to 100:0.

18. The system of claim 7, wherein the fluid pill is a water-based fluid comprising a brine selected from the group consisting of chloride brine, bromide brine, formate brine, and mixtures thereof.

19. The system of claim 3, wherein the controller is programmed to instruct the pump to expel the fluid pill from the tool body after operation of the downhole tool for a pre-selected amount of time or based on a location of the at least one chamber in the tool body relative to a downhole location in the wellbore.

20. The system of claim 3, wherein the fluid pill includes a single fluid containing one or more reactants that are maintained separately via a degradable coating or encapsulation material on at least one of the reactants.

* * * * *